(12) United States Patent
Chen

(10) Patent No.: US 11,802,412 B2
(45) Date of Patent: Oct. 31, 2023

(54) PLANK WITH VENEER MATERIAL FUSED TO RIGID CORE

(71) Applicant: Wellmade Floor Covering International, Inc., Tualatin, OR (US)

(72) Inventor: Zhu Chen, Nanjing (CN)

(73) Assignee: WELLMADE FLOOR COVERING INTERNATIONAL, INC., Tualatin, OR (US)

(*) Notice: Subject to any disclaimer, the term of this patent is extended or adjusted under 35 U.S.C. 154(b) by 0 days.

(21) Appl. No.: 17/740,707

(22) Filed: May 10, 2022

(65) Prior Publication Data

US 2022/0259871 A1 Aug. 18, 2022

Related U.S. Application Data

(62) Division of application No. 16/784,382, filed on Feb. 7, 2020, now Pat. No. 11,421,427.

(Continued)

(51) Int. Cl.
*E04F 15/10* (2006.01)
*B32B 21/14* (2006.01)
(Continued)

(52) U.S. Cl.
CPC ............ *E04F 15/107* (2013.01); *B32B 7/12* (2013.01); *B32B 21/14* (2013.01); *E04F 15/042* (2013.01);
(Continued)

(58) Field of Classification Search
CPC ........ E04F 15/107; E04F 15/042; B32B 7/12; B32B 21/08; B32B 21/14; B32B 2262/101; B32B 2419/04
See application file for complete search history.

(56) References Cited

U.S. PATENT DOCUMENTS 3,849,174 A 11/1974 Ancker
5,356,705 A 10/1994 Kelch et al.
(Continued)

FOREIGN PATENT DOCUMENTS

CN 101590695 A 12/2009
CN 102501506 A 6/2012
(Continued)

OTHER PUBLICATIONS

Chen et al., "An Engineered Plank and Its Manufacturing Method", U.S. Appl. No. 15/145,667, filed May 3, 2016.
(Continued)

*Primary Examiner* — Catherine A. Simone
(74) *Attorney, Agent, or Firm* — Venable LLP

(57) ABSTRACT

A plank has a first portion with at least three layers. The first layer is of a plant material, and has an inner surface that includes a nonwoven fabric or a fiberglass mesh. The second layer is of an adhesive paper material that includes a macromolecular glue where the macromolecular glue is 50-55% melamine, 35-40% plasticizer, and 3-5% formaldehyde. The third layer is one of bamboo, wood, or paper. The plank has a second portion, which may be of a plastic composite base material or a magnesium oxide composite base material. When the second portion is of a plastic composite material, the first portion is fused to the second portion by cold pressing or a polyurethane reactive adhesive. When the second material is of a magnesium oxide composite base material, the first portion is thermally pressed to the second portion by cold pressing, hot pressing or a polyurethane reactive adhesive.

10 Claims, 4 Drawing Sheets

Related U.S. Application Data

(60) Provisional application No. 62/854,405, filed on May 30, 2019, provisional application No. 62/808,026, filed on Feb. 20, 2019.

(51) Int. Cl.
  *B32B 21/08* (2006.01)
  *B32B 7/12* (2006.01)
  *E04F 15/04* (2006.01)

(52) U.S. Cl.
  CPC ......... *B32B 21/08* (2013.01); *B32B 2262/101* (2013.01); *B32B 2419/04* (2013.01)

(56) References Cited

U.S. PATENT DOCUMENTS

| | | | |
|---|---|---|---|
| 5,424,363 | A | 6/1995 | Nagata et al. |
| 6,444,075 | B1 | 9/2002 | Schneider et al. |
| 2001/0049242 | A1 | 12/2001 | Soininen et al. |
| 2010/0247861 | A1 | 9/2010 | Mitchell |
| 2011/0207870 | A1 | 8/2011 | Bussels et al. |
| 2011/0254190 | A1 | 10/2011 | Wagh et al. |
| 2011/0293914 | A1 | 12/2011 | Maurer et al. |
| 2013/0230687 | A1 | 9/2013 | Chen |
| 2015/0114552 | A1 | 4/2015 | Cernohous et al. |
| 2015/0273804 | A1 | 10/2015 | Haixing |
| 2016/0264461 | A1 | 9/2016 | Peng et al. |
| 2016/0340254 | A1 | 11/2016 | Edgar et al. |
| 2017/0136674 | A1 | 5/2017 | Chen et al. |
| 2017/0321435 | A1 | 11/2017 | Chen et al. |
| 2019/0145109 | A1 | 5/2019 | Esbelin |

FOREIGN PATENT DOCUMENTS

| | | |
|---|---|---|
| CN | 104924370 A | 9/2015 |
| CN | 105295256 A | 2/2016 |
| CN | 105328954 A | 2/2016 |
| CN | 205134872 U | 4/2016 |
| CN | 205171925 U | 4/2016 |
| CN | 105625674 A | 6/2016 |
| CN | 105649298 A | 6/2016 |
| CN | 106892639 A | 6/2017 |
| GB | 190012317 A | 8/1900 |
| GB | 190818681 A | 9/1909 |
| GB | 426853 A | 4/1935 |
| GB | 1104793 A | 2/1968 |
| GB | 1162171 A | 8/1969 |
| JP | H06055967 A | 3/1994 |
| JP | H07314476 A | 12/1995 |
| KR | 100679815 B1 | 1/2007 |
| SU | 903332 A1 | 2/1982 |
| WO | 2015168610 A1 | 11/2015 |
| WO | 2017192374 A1 | 11/2017 |
| WO | 2018034614 A1 | 2/2018 |

OTHER PUBLICATIONS

Chen et al., "Engineered Plank and Its Manufacturing Method", U.S. Appl. No. 15/354,674, filed Nov. 17, 2016.
International Search Report and Written Opinion for PCT/US2018/031952 dated Aug. 23, 2018.
International Search Report and Written Report for PCT/US2016/062614 dated Jan. 24, 2017.
Machine Translation of CN 107098618 dated Jan. 2, 2018, 4 pages.
Machine Translation of JP H06-055967 dated Mar. 3, 1994, 7 pages.
Office Action dated Dec. 7, 2016, for U.S. Appl. No. 15/145,667, filed May 3, 2016.
Office Action dated Jul. 18, 2016, for U.S. Appl. No. 15/145,667, filed May 3, 2016.
Office Action dated Jul. 15, 2016, U.S. Appl. No. 14/997,965, filed Jan. 18, 2016, 12 pages.
Sika, "Product Data Sheet Sikafloor-O-420", Apr. 2017, site visited Jul. 11, 2018, <https://www.rawlinspaints.com/home/floor-paints/medium-use/2076-sikafloor-420.html>.

PLANK WITH VENEER MATERIAL FUSED TO RIGID CORE

RELATED APPLICATION DATA

This application is a divisional application from U.S. patent application Ser. No. 16/784,382, filed Feb. 7, 2020, currently pending, which claims the benefit of U.S. provisional patent application Ser. No. 62/808,026 filed Feb. 20, 2019 and 62/854,405, filed May 30, 2019, the disclosures all of which are hereby incorporated by reference.

SUMMARY

The disclosure is directed to a plank, for instance, a flooring plank that has a first portion comprising a veneer and a second portion comprising a rigid core. The first portion veneer, which may be comprised of one or more layers of material, is fused to the second portion to provide a water proof and temperature stable plank material suitable for flooring and other construction use.

One aspect of the present disclosure provides a plank constructed with a first portion comprising a plurality of layers. The first layer of the first portion may comprise a plant material, such as wood, bamboo, or another plant-based component, and include one of a nonwoven fabric and a fiberglass mesh adhered to an inward-facing portion of the first layer in order to increase the impact resistance of the plank. The second layer of the first portion may comprise an adhesive paper material infused with a macromolecular glue. The macromolecular glue may comprise 50-55% melamine, 35-40% plasticizer, and 3-5% formaldehyde. The first portion may include a third layer comprising one of bamboo, wood, or paper. When the third layer of the first portion, is constructed from plant material, the plant material may be dry balanced and permeated with flame retardant material. For example, the plant material of the third layer may be kiln dried in order to reduce the moisture content, and to ensure that the moisture content is even or balanced. Reducing the moisture content of the material may help the material to be more insect-resistant and free of mildew. The third layer of the first portion may also be constructed from plant material that has been de-sugared and skimmed. The de-sugaring and skimming might be done at a controlled steam pressure of between 245 and 490 kPa. As described in greater detail below, the plurality of layers of the first portion of the plank may be compressed together with the second portion comprising the rigid core to form the flooring plank.

In another aspect of the disclosure, the first portion comprises a single layer of wood or bamboo as a veneer. The wood or bamboo veneer of the first portion of the plank is compressed together with the second portion comprising the rigid core to form the flooring plank.

In another aspect, the second portion comprises a plastic composite base that may be produced by extruding out a compound, for instance, a high density polyvinyl chloride (PVC). The compound may be produced from a mixture including one or more of polyvinyl chloride powder, coarse whiting and light calcium compound powder, stabilizer, polyethylene wax, internal lubricant, plasticizer, and impact modifier. For example, the plastic substrate of a plank may be made using PVC powder, course whiting and light calcium powder, and stabilizer. The plank may also be made without using light calcium powder. A veneer as described above may be cold pressed or adhered with a polyurethane reactive adhesive to the plastic composite base. The cold press may take place at a pressure of about 8 $Kg/cm^2$ to about 10 $Kg/cm^2$. The time for cold pressing may be between about 3 hours and 5 hours, and more preferably about 4 hours.

In some aspects, the plastic composite substrate layer may be extruded and compounded by a layer of plastic substrate. The plastic composite substrate layer may be extruded and compounded by two or more layers of plastic substrate. For instance, in an aspect of the disclosure, the second portion plastic composite base material may have a first extruded substrate layer, a second extruded substrate layer and a third extruded substrate layer. The second extruded substrate layer may be located between and in direct contact with the first and third extruded substrate layers. The second extruded substrate layer may have different physical properties than the first and third extruded substrate layers. In one embodiment, the first extruded substrate layer and third extruded substrate layer may have a higher hardness than the second extruded substrate layer. In another embodiment, the first extruded substrate layer and third extruded substrate layer of the plastic composite base may have higher resistance to impact than the second extruded substrate layer. In a further example, the first and third extruded substrate layers may have identical physical properties. A veneer as described above may be cold pressed or adhered to the multi-layer, coextruded plastic composite base.

In another aspect, the second portion comprises a magnesium oxide (MgO) composite base material, and the first portion is pressed to the second portion without the use of intermediate adhesive material. The second portion may comprise a mixture of magnesium oxide (MgO) with at least one of magnesium chloride ($MgCl_2$) and magnesium sulfite ($Mg(SO_3)$). A veneer as described above may be cold pressed, hot pressed or adhered with a polyurethane reactive adhesive to the magnesium oxide (MgO) composite base. The cold press may take place at a pressure of about 8 $Kg/cm^2$ to about 10 $Kg/cm^2$. The time for cold pressing may be between about 3 hours and about 5 hours, and more preferably about 4 hours. The hot press may take place at a pressure of about 800 $Ton/m^2$. The time for hot pressing may be between about 6 minutes and about 8 minutes.

In another aspect, a balancing layer is provided on the base of the rigid core to create tension in the flooring plank which helps balance the laminate, multi-layer structure of the flooring plank. The balancing layer may comprise a melamine impregnated paper layer adhered to the base of the rigid core. The balancing layer may also comprise a vinyl wear layer adhered to the base of the rigid core. The balancing layer works to hold the flooring plank relatively flatter than designs without the balancing layer while also adding an additional layer of water proofing protection. The balancing layer may be adhered to a rigid core that comprises high density polyvinyl chloride (PVC) or MgO, as described herein. The balancing layer may also be co-extruded with a high density polyvinyl chloride (PVC) rigid core and heat applied to the rigid core to attach the balancing layer without glue. An anti-slip, cushioning backing layer may be applied to the balancing layer without glue, or an IXPE backing layer may be applied to the balancing layer with glue.

DETAILED DESCRIPTION

Figure 1:
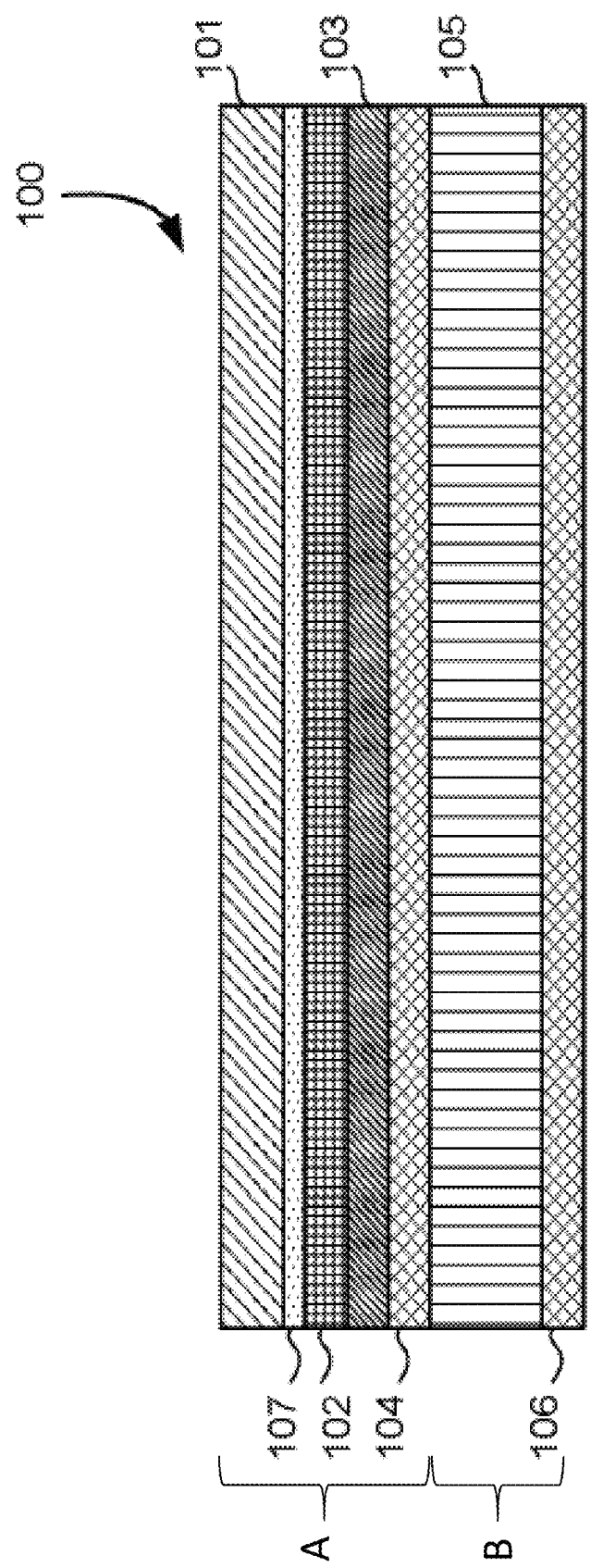
FIG. 1 is an exemplary flooring material according to some aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include a flooring plank that is waterproof, fireproof, and resistant to impact. The first portion of the plank may include a veneer that comprises a top layer and repeated layers of paper, fiberglass mesh, bamboo and/or wood. The veneer top layer may be made out of bamboo or wood. The paper may include adhesive paper, kraft paper or other types of paper. The mesh layer may be a fiberglass mesh layer. For example, every second layer may be a layer of adhesive paper. In some aspects, a fiberglass mesh may be adhered to a piece of plant material, such as wood, bamboo, or another plant-based component, in order to make a veneer that is less prone to cracking under impact. In some aspects, underneath the top layer (veneer) of the first portion, there may be first adhesive paper layer. This first adhesive paper layer may include a macromolecular glue. Generally macromolecular glue may comprise 50-55% melamine, 35-40% plasticizer, and 3-5% formaldehyde. Some or all layers of the plank of the first portion which are constructed out of plant material may be de-sugared and skimmed under high pressure. In some aspects, each plant material layer other than the veneer of the first portion may be de-sugared and skimmed under high pressure. Some or all of the plant material layers including the veneer may also be dry balanced, and permeated with flame retardant materials. A nonwoven fabric or fiberglass mesh layer may be applied to the veneer in order to increase resistance to impact and to prevent cracking.

For example, in one aspect, the first portion may be constructed by first de-sugaring each plant material layer except the veneer, and skimming those layers under high temperature. Second, a nonwoven fabric or fiberglass mesh layer may be applied to the veneer. Third, each plant material layer including the veneer may be dry balanced. Fourth, the dry balanced plant material layers may be permeated with flame retardants under negative pressure. Fifth, the layers may be compressed together using a press machine under high pressure to form the first portion (A) and bond the first portion to the second portion (B). Optionally, a balancing layer may be applied to the bottom of rigid core with or without an adhesive. The balancing layer may be pressed, adhered or extruded onto the second portion (B), or may be pressed together with the other layers. Further, a sound absorbing, anti-slip backing layer may be applied to the bottom of the balancing layer with or without an adhesive after first portion (A) is pressed together with the second portion (B).

Due to the use of a macromolecular glue in the first adhesive paper layer, during pressing, this glue may semi-penetrate into the veneer. This may help to finish the painting treatment afterwards. Glue may also completely penetrate into kraft paper of fiberglass mesh layers and between the plant material layers. This can help achieve a waterproofing function for the first portion (A). Further, applying a non-woven fabric or fiberglass mesh layer to the back of the veneer may prevent the veneer from cracking and increase the smoothness and stability of the finished first portion. This nonwoven fabric or fiberglass mesh layer can also increase the impact resistance of the first portion and plank overall, and once it is permeated with fire retardant, may also aid in fireproofing the plank.

FIGS. 1-4 show exemplary planks 100,200,300,400. The plank 100,200,300,400 comprises a first portion (A) includes a first layer 101 comprising a veneer generally made from a wood material 101 which has nonwoven fabric or fiberglass layer 107 adhered to the inward-facing portion of the first layer 101. The first portion (A) includes a second layer 102 comprising an adhesive paper which is permeated with macromolecular glue. The first portion (A) also includes a third layer 103 which may be one of bamboo, wood or kraft paper. The first portion (A) may also include a fourth layer 104 of adhesive paper which has been permeated with polyurethane reactive adhesive. The plank 100, 200,300,400 comprises a second portion (B,B'B",B''') which includes a thick rigid core 105,205,305 that has been applied to the first portion (A). The plank second portion may include an optional bottom layer 106 that may serve as a leveling device, a sound absorbing device, a cushioning device, a non-skid device, and/or a combination of these functions. The bottom layer 106 may be cork, EVA, PPI, IXPE, XPS, or any other rubber/foam/plastic/PVC, or petrochemical based backing. The nonwoven fabric or fiberglass mesh layer 107 of the first portion A of the plank may be applied to the first layer veneer 101, in order to increase impact resistance of the plank. The type of nonwoven fabric or fiberglass mesh layer 107 that is used may depend, at least in part, on the type and thickness of the plank. A 20 mesh nonwoven fabric or a 40 mesh nonwoven fabric may be used for the layer 107.

In the example of FIG. 1 involving a second portion (B) comprising a rigid core 105 of a high density PVC base material, the first portion (A) of the plank 100 may be fused to the plastic composite base material forming the rigid core 105 of the plank second portion (B) by cold press compression or by application of a polyurethane reactive adhesive 104 applied to the third layer 103. The plastic composite base forming the rigid core 105 of the second portion (B) of the plank 100 may be produced as an extrudate by extruding out a compound. The extrudate compound may be produced from a mixture including one or more of polyvinyl chloride powder, coarse whiting and light calcium compound powder, stabilizer, polyethylene wax, internal lubricant, plasticizer, and impact modifier. The cold press may take place at a pressure of between about 8 Kg/cm$^2$ and about 10 Kg/cm$^2$. The time of cold pressing may be between about 3 hours and about 5 hours, and more preferably, about 4 hours.

Figure 2:
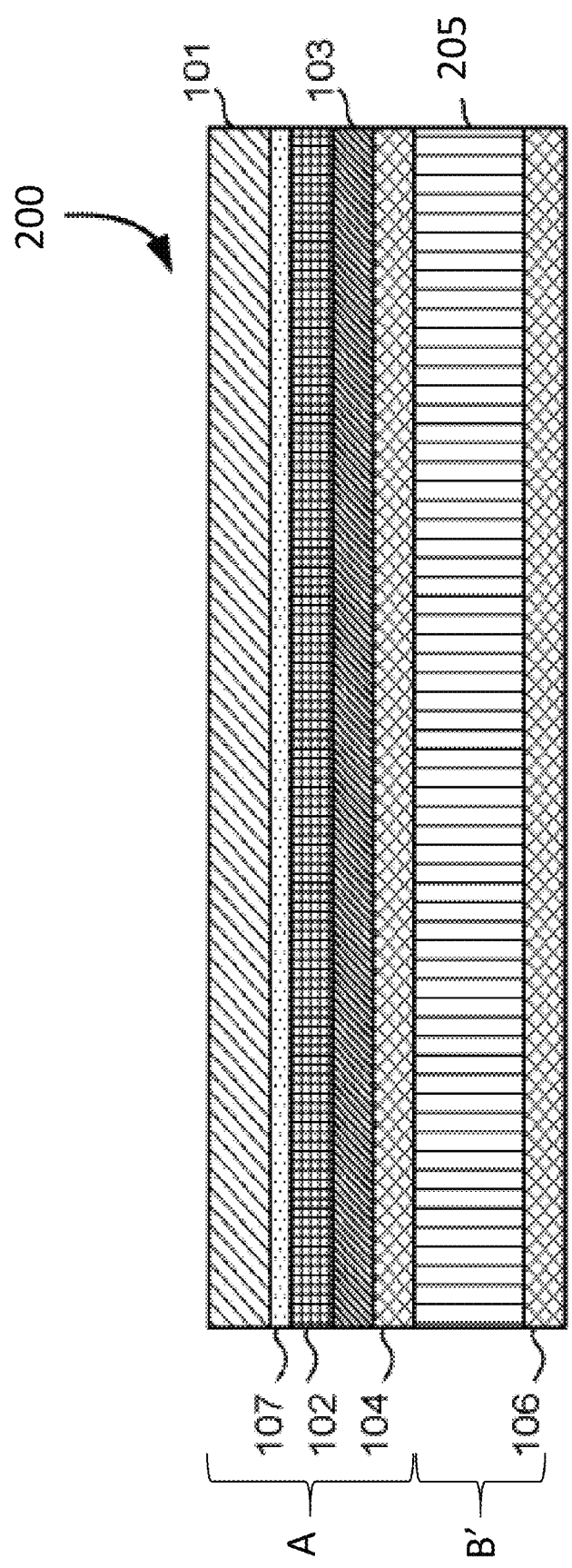
FIG. 2 is another exemplary flooring material according to some aspects of the present disclosure.

FIG. 2 shows another embodiment of the plank 200. The first portion (A) of the plank 200 is as described above, and the rigid core 205 of the second portion (B') of the plank 200 may comprise a magnesium oxide (MgO) composite base material. The first portion (A) of the plank may be cold pressed, hot pressed or adhered with a polyurethane reactive adhesive to the magnesium oxide (MgO) composite base. The cold press may take place at a pressure of about 8 Kg/cm$^2$ to about 10 Kg/cm$^2$. The time for cold pressing may be between about 3 hours and about 5 hours, and more preferably about 4 hours. The hot press may take place at a pressure of about 800 Ton/m$^2$. The time for hot pressing may be between about 6 minutes and about 8 minutes. The rigid core 205 of the second portion (B') of the plank 200 may comprise a mixture of magnesium oxide (MgO) with at least one of magnesium chloride ($MgCl_2$) and magnesium sulfite ($Mg(SO_3)$).

Figure 3:
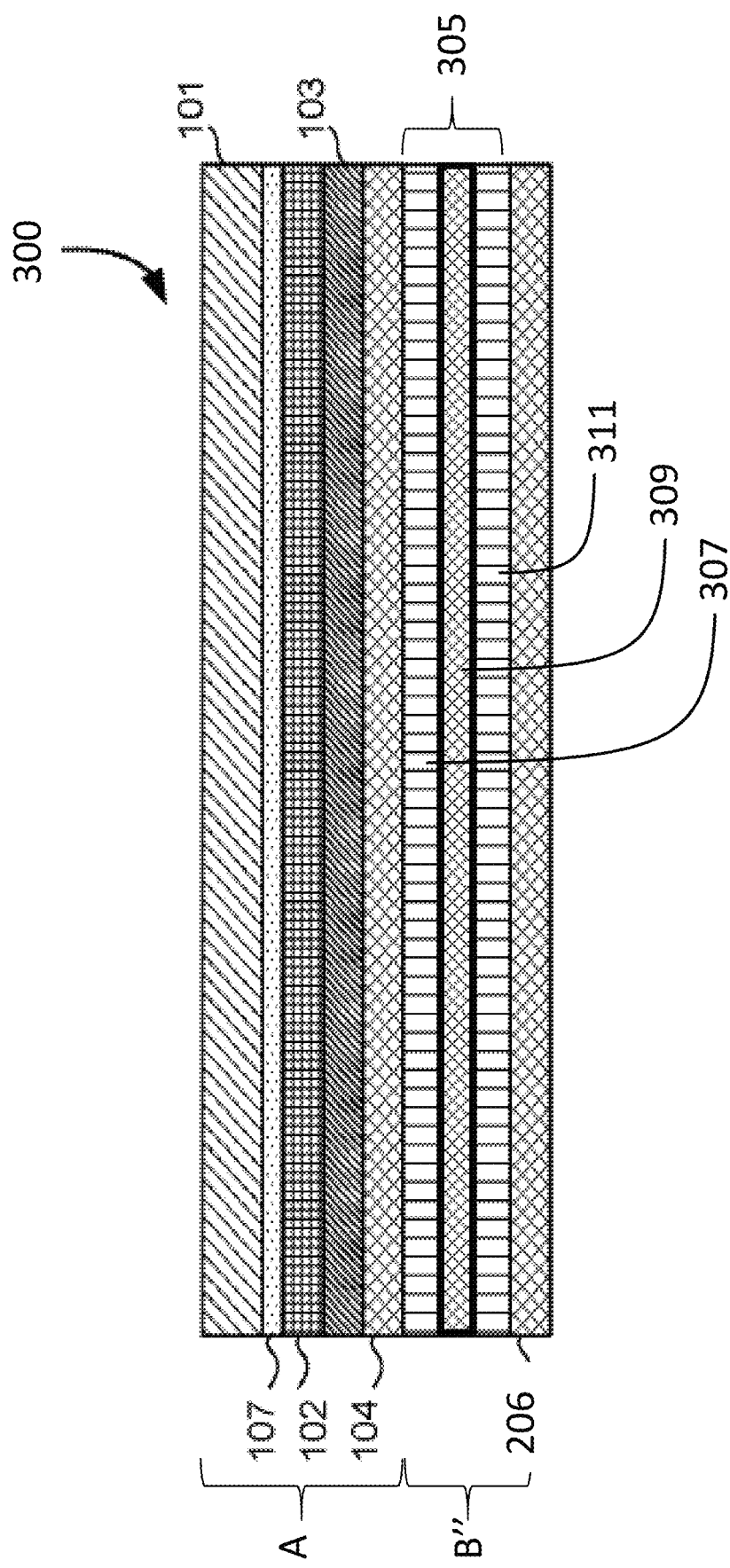
FIG. 3 is another exemplary flooring material according to some aspects of the present disclosure.

FIG. 3 shows a further example of the plank 300. The first portion A of the plank 300 may be as described above and the second portion (B″) may comprise an extrudate 305 with a first extruded substrate layer 307, a second extruded substrate layer 309, and a third extruded substrate layer 311. The second extruded substrate layer 309 may be located between and in direct contact with the first and third extruded substrate layers 307,311. The second extruded substrate layer 309 may have different physical properties than the first and third extruded substrate layers 307,311. In one embodiment, the first extruded substrate layer 307 and third extruded substrate layer 311 may have a higher hardness than the second extruded substrate layer 309. In another embodiment, the first extruded substrate layer and third extruded substrate layer of the plastic composite base may have higher resistance to impact than the second extruded substrate layer. In a further example, the first and third extruded substrate layers may have identical physical properties. The extrudate of each substrate layer may comprise a mixture including one or more of polyvinyl chloride powder, coarse whiting and light calcium compound powder, stabilizer, polyethylene wax, internal lubricant, plasticizer, and impact modifier. The first portion (A) of the plank 300 may be cold pressed or adhered with a polyurethane reactive adhesive to the plastic composite base of the second portion (B). The cold press make take place at a pressure of about 8 $Kg/cm^2$ to about 10 $Kg/cm^2$. The time for cold pressing may be between about 3 hours and 5 hours, and more preferably about 4 hours.

Figure 4:
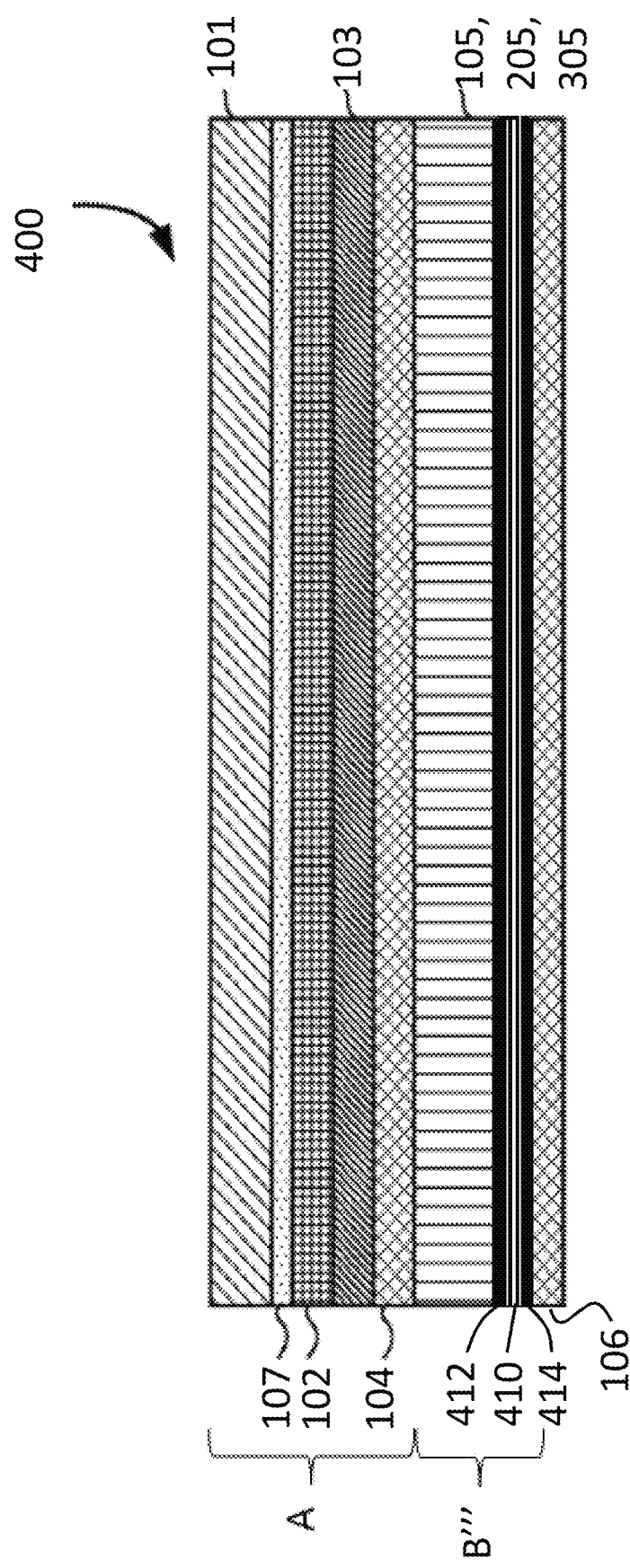
FIG. 4 is another exemplary flooring material according to some aspects of the present disclosure.

FIG. 4 shows a further example of the plank 400. The second portion (B‴) may comprise a rigid core of a high density PVC base material 105 as described above, a magnesium oxide (MgO) composite base material 205 as described above, or multiple extrudate layers 305 as described above. The first portion (A) of the plank 400 may be fused to the rigid core 105,205,305 of the plank second portion (B) by one of the aforementioned methods applicable for the type of rigid core used. A balancing layer 410 may be applied to the base of the rigid core 105,205,305 by an adhesive 412 prior to pressing the first portion (A) of the plank 400 to the second portion (B) of the plank. The balancing layer may also be extruded with the second portion (B) when the second portion (B) comprises an extrudate, for instance an extrudate of high density polyvinyl chloride (PVC). After pressing the first portion (A) of the plank 400 to the second portion (B) of the plank, the sound absorbing, anti-slip layer 106 may be applied to the balancing layer with an adhesive 414. The balancing layer may comprise a vinyl film or a melamine impregnated paper.

The examples that follow are intended to illustrative of the methods of manufacturing various portions of the planks, and any of the methods described below for manufacturing the first portion may be combined with any of the methods described below for manufacturing the second portion. Generally, one flooring material may be chosen over another, such as plank 100 over plank 200 or plank 300 or plank 400 or vice versa, based upon the needs of a particular application. For example, different flooring materials may have difference performance characteristics and rigidity strengths, and so may be chosen on this basis.

Example 1

One example of a first portion of a plank may comprise a first layer 101 veneer that is a 0.45 mm thick oak panel 101 which has nonwoven fabric 107 adhered to the inward-facing portion of the panel 101. The second layer 102 may comprise a 0.05 mm thick adhesive paper layer 102 which is permeated with macromolecular glue. The first portion (A) also includes a 0.2 mm thick layer of kraft paper 103, and a 0.1 mm thick layer of adhesive paper 104 which has been permeated with micromolecular glue.

One example of the manufacturing process for the first portion of the aforementioned plank may be as follows:

1. Glue is used to apply a 40 mesh nonwoven fabric 107 to the first layer 101 veneer 0.45 mm oak panel.
2. The first layer 0.45 mm oak panel 101 is dry balanced. This process controls the water content of the panel to be between 8% and 9%.
3. The first layer 0.45 mm oak panel 101 are permeated with flame retardant under negative pressure.
4. The various layers of the first portion (A) of the plank are layered in the illustrated order and described order into a press machine and then pressed together with a second portion, which may be a plastic composite base second portion (B) consistent with that shown and described above in reference to FIGS. 1 and 3, or a magnesium oxide base second portion (B) consistent with that shown and described above in reference to FIG. 2, in accordance with the respective aforementioned parameters.

Example 2

Another example of a first portion of a plank includes a first layer 101 of veneer, which is a 0.5 mm thick black walnut panel with a 20 mesh nonwoven fabric 107 which is applied to the back (inward-facing) side of the first layer walnut panel using glue in order to prevent the veneer from cracking, such as during an impact. Next, there is a second layer 102 of 0.05 mm thick adhesive paper which is infused with macromolecular glue. Next, there is a third layer 103 of 0.2 mm thick kraft paper, and a fourth layer 104 of 0.1 mm thick adhesive paper, which is permeated with polyurethane reactive adhesive.

A manufacturing process for the first portion of the aforementioned plank may be as follows:

1. Glue is used to apply a 20 mesh nonwoven fabric 107 to the first layer 101 0.5 mm black walnut panel.
2. The first layer 101 0.5 mm black walnut panel 101 is balanced. This process controls the water content of the panels to be between 6% and 7%.
3. The first layer 101 is permeated with flame retardant under negative pressure.
4. Next, the various layers of the first portion are layered in the illustrated order and described order into a press machine, and then pressed together to form a plank. The first portion (A) may then be applied to a second portion (B), which may be a plastic composite base second portion (B) consistent with that shown and described above in reference to FIGS. 1 and 3, a magnesium oxide base second portion (B) consistent with that shown and described above in reference to FIG. 2, or a rigid core second portion (B) with a balancing layer 410 consistent with that shown and described above in reference to FIG. 4.

Example 3

Another example of a first portion of a plank includes a first layer 101 of a veneer which is 0.5 mm birch panel 101 with a 20 mesh nonwoven fabric 107 which is applied to the back (inward-facing) side of the birch panel 101 using glue in order to prevent the veneer from cracking, such as during an impact. Next, there is a second layer 102 of 0.05 mm thick adhesive paper which is permeated with macromolecular glue. Next, there is a third layer 103 of 0.2 mm thick kraft paper layer 103, and a fourth layer of 0.1 mm thick adhesive paper layer 104, which is permeated with polyurethane reactive adhesive.

A manufacturing process for the first portion of the aforementioned plank may be as follows:

1. Glue is used to apply a 40 mesh nonwoven fabric 107 to the first layer 101 0.5 mm birch panel of veneer.

2. The first layer 101 0.5 mm birch panel is are dry balanced. This process controls the water content of the panels to be between 6% and 7%.

3. The first layer 101 0.5 mm birch panel is permeated with flame retardant under negative pressure.

4. Next, the various layers of the first portion of the plank are layered in the illustrated order and described order into a press machine, and then pressed together to form the first portion. The first portion (A) may then be applied to a second portion (B), which may be a plastic composite base second portion (B) consistent with that shown and described above in reference to FIGS. 1 and 3, a magnesium oxide base second portion (B) consistent with that shown and described above in reference to FIG. 2, or a rigid core second portion (B) with a balancing layer 410 consistent with that shown and described above in reference to FIG. 4.

Example 4

Another example of a first portion of a plank includes a first layer 101 of veneer, which is 0.5 mm oak panel with a 20 mesh nonwoven fabric 107 which is applied to the back (inward-facing) side of the oak panel 101 using glue in order to prevent the veneer from cracking, such as during an impact. Next, there is a second layer 102 of 0.05 mm thick adhesive paper which is permeated with macromolecular glue. Next, there is a third layer 103 of 0.2 mm thick kraft paper layer, and a fourth layer 104 of 0.1 mm thick adhesive paper layer, which is permeated with polyurethane reactive adhesive.

A manufacturing process for the first portion of the aforementioned plank may be as follows:

1. Glue is used to apply a 20 mesh nonwoven fabric 107 to the first layer 101 0.5 mm oak panel of veneer.

2. The first layer 101 0.5 mm oak panel is dry balanced. This process controls the water content of the panels to be between 8% and 9%.

3. The first layer 101 0.5 mm oak panel is permeated with flame retardant under negative pressure.

4. The various layers of the first portion are layered in the illustrated order and described order into a press machine, and then pressed together to form a plank. The first portion (A) may then be applied to a second portion (B), which may be a plastic composite base second portion (B) consistent with that shown and described above in reference to FIGS. 1 and 3, a magnesium oxide base second portion (B) consistent with that shown and described above in reference to FIG. 2, or a rigid core second portion (B) with a balancing layer 410 consistent with that shown and described above in reference to FIG. 4.

Example 5

Referring to FIG. 1, an example of a rigid core 105 of the second portion (B) of the plank may include a plastic composite base material formed with PVC powder, coarse whiting and light calcium compound powder, stabilizer, PE wax, internal lubricant, plasticizer, and impact modifier by proportion of weight. This mixture may then be stirred in order to achieve an even consistency. The rigid core 105 comprising a plastic composite substrate layer is extruded out, and may be made from a mixture including one or more of PVC powder, coarse whiting and light calcium compound powder, stabilizer, PE wax, internal lubricant, plasticizer, and impact modifier. Plastic composite substrate layer forming the rigid core 105 may be a uniform mixture of two or more of the above components, such that it has a single texture, appearance, and physical properties. Some components might be omitted, such as the light calcium compound powder.

A manufacturing process for the aforementioned second portion (B) may be as follows:

1: Mix PVC powder with coarse whiting and light calcium compound powder, stabilizer, PE wax, internal lubricant, plasticizer, and impact modifier by proportion of weight. Each of these components may be added in different quantities, or may be excluded as desired. This mixture may then be stirred. In some aspects, during the hot mixing process, the mixture temperature may be controlled to be approximately 110-120° C. For example, it may be desired to keep the mixture within 5, 10, 15, or 20° C. from 115° C. during this hot mixing process. Some subset of these components might be mixed in a cold mixing process prior to being mixed with the other components in the hot mixing process.

2: The mixture may then be extruded. The extruded product may be a compound which then forms the plastic composite substrate layer. Extrusion might involve a three-roll calender. The balancing layer may then be applied to the composite base material.

3: The first portion (A) may then be tiled onto the extruded plastic composite base material with the balancing layer already applied thereto in a fixed position, and the layers may be cold pressed at a pressure of about 8 Kg/cm$^2$ to about 10 Kg/cm$^2$, and a time of about 4 hours.

4: After this, the plank may be cooled, sized, and cut into the desired dimensions, based on the needs of the particular project or the plank design.

Example 6

Referring to FIG. 2, an example of a rigid core 205 of the second portion (B') of the plank may be formed from a sheet of a cured magnesium oxide based material. For instance, the sheet may be made from a process of hot pressing a mixture of magnesium oxide (MgO), magnesium chloride (MgCl$_2$), and/or magnesium sulfite (MgSO$_3$). The mixture may include layers of fiberglass mesh to provide structural reinforcement in the material. The material may contain wood fiber for structural reinforcement. The mixture may be deposited in a mold and compressed under pressure together with the first portion (A) and the balancing layer 410 to form a 4 foot×8 foot rectangular sheet. A hot press or cold press may be used. The cold press may take place at a pressure of about 8 Kg/cm$^2$ to about 10 Kg/cm$^2$ and a time of about 4 hours. The hot press may take place at a pressure of about 800 Ton/m$^2$ and a time of about 7 minutes. The sheet made then be cut into the planks used for flooring or other shapes as need. The finished planks may have edge profiles allowing it to be locked in place with laterally adjacent floor planks.

Example 7

FIG. 3 illustrates an exemplary plank 300 having a rigid core 305 using a three-layer substrate 307,309,311. In this plank 300, the first portion (A) as described above and the layers of the substrate 307,309,311 are attached to one another using thermal compression. The rigid core 305 plastic composite base layer may be extruded and compounded by three layers of plastic composite substrates 307,309,311 each having a mixture containing one or more of PVC powder, coarse whiting and light calcium compound powder, stabilizer, PE wax, internal lubricant, plasticizer, and impact modifier. The different layers of the substrate 307,309,311 may have different compositions, in order to allow plank 300 to have desirable characteristics and physical properties. For example, second layer 309 may have lower requirements on hardness and resistance to impact. This may allow the use of an increased ratio of PVC powder and light calcium, and a decreased ratio of coarse whiting. A foaming agent may also be used in second layer 309, which may allow for less material to be in second layer, which may reduce production costs. First layer 307 and third layer 311 may have higher requirements with regards to hardness and resistance to impacts, and so these layers may be constructed using a higher ratio of coarse whiting in the plastic composite base material formula and a lower ratio of PVC powder and light calcium. First layer 307 and third layer 311 can be made of the identical material or could be made of different materials. The three-layer 307,309,311 substrate may be produced in a number of manners. One technique for producing such a substrate includes using triple inlets to send different plastic composite base material mixtures into the extruder. This three-layer 307,309,311 substrate may be extruded using an extruded with the same mold as other substrates, and is then thermally compressed and pasted with the first portion (A), as described above. The substrate is formed in a single process, allowing for continuous production in an automated manner.

In an alternate embodiment to the three layer substrate shown in FIG. 3 and described above, the second portion (B) may include a rigid core with a first plastic composite substrate layer and a second plastic composite substrate layer. The first plastic composite substrate layer and second plastic composite substrate layer are extruded simultaneously to form the second portion (B). The two plastic composite substrate layers may be both extruded and compounded by the mixture containing PVC powder, coarse whiting and light calcium compound powder, stabilizer, PE wax, internal lubricant, plasticizer, and impact modifier. In some aspects, it may be advantageous to use two or more layers of plastic composite substrates, in order to allow the two layers to have different physical properties. For example, the first plastic composite substrate layer of second portion (B) may have higher requirements on hardness and resistance to impact. This requirement may be met by constructing the layer from a slightly different mixture, such as increasing a ratio of coarse whiting in the plastic composite base material formula and decreasing a ratio of PVC powder and light calcium. Second plastic composite substrate layer of the second portion (B) may have lower requirements on hardness and resistance to impact than first plastic composite substrate layer. In second plastic composite substrate layer, the mixture may have an increased ratio of PVC powder and light calcium, and a decreased ratio of coarse whiting in the plastic composite base material formula. Second plastic composite substrate layer may also add a foaming agent. The first plastic composite substrate layer and second plastic composite substrate layer may be produced using a double inlet to send different plastic composite base material mixtures into an extruder. The compounded two-layered structure, plastic composite substrate layers may be extruded by an extruder with the same extrusion mold. The two plastic composite substrate layers may be thermally compressed and pasted with the first portion (A). The rigid core second portion (B) with two plastic composite substrate layers may be formed in a single step, which may allow for continuous automated production. Since second plastic composite substrate layer uses foam structure, with the added foaming agent, second plastic composite substrate layer may use fewer raw materials in production, which may result in a more economical production cost.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed:

1. A plank comprising:
 a first portion comprising:
  a first layer comprising a plant material, the first layer having an outer surface and an opposite inner surface, the inner surface including one of a nonwoven fabric and a fiberglass mesh;
  a second layer comprising an adhesive paper material including a macromolecular glue, the macromolecular glue comprising 50-55% melamine, 35-40% plasticizer, and 3-5% formaldehyde; and
  a third layer comprising one of bamboo, wood, or paper; and
 a second portion comprising a mixture of magnesium oxide (MgO) with at least one of magnesium chloride ($MgCl_2$) and magnesium sulfite ($Mg(SO_3)$);
 wherein the first portion is thermally pressed to the second portion by one of cold pressing, hot pressing and polyurethane reactive adhesive.

2. The plank of claim 1, wherein the plant material of the first layer of the first portion comprises bamboo and/or wood, and the first layer and the third layer of the first portion are constructed from bamboo and/or wood that has been dry balanced and permeated with flame retardant material.

3. The plank of claim 1, wherein the one of the bamboo, wood, or paper of the third layer of the first portion is plant material that has been de-sugared and skimmed.

4. The plank of claim 3, wherein the plant material of the third layer of the first portion that has been de-sugared and skimmed is de-sugared and skimmed at a controlled steam pressure between 245 and 490 kPa.

5. The plank of claim 1, wherein the plant material of the first layer of the first portion is a veneer with a thickness of at least 0.45 mm, the first layer includes the nonwoven fabric, and the nonwoven fabric is at least 20 mesh nonwoven fabric.

6. The plank of claim 1, wherein the adhesive paper material of the second layer of the first portion comprises 0.05 mm thick adhesive paper infused with the macromolecular glue.

7. The plank of claim 6, wherein the third layer is a paper, and the paper comprises 0.2 mm thick kraft paper.

8. The plank of claim 1 wherein the cold press occurs at a pressure of about 8 Kg/cm2 to about 10 Kg/cm2 and a time of between about 3 hours and about 5 hours.

9. The plank of claim 1 wherein the hot press occurs at a pressure of about 800 T/m2 and a time of between about 6 minutes and about 8 minutes.

10. The plank of claim 1 further comprising a balancing layer applied to a base of the mixture, the balancing layer comprising one of a melamine impregnated paper layer and a vinyl layer.

* * * * *